(12) United States Patent
Levi et al.

(10) Patent No.: US 10,313,460 B2
(45) Date of Patent: Jun. 4, 2019

(54) CROSS-DOMAIN INFORMATION MANAGEMENT

(71) Applicant: Hewlett Packard Enterprise Development LP, Houston, TX (US)

(72) Inventors: Elad Levi, Yehud (IL); Avigad Mizrahi, Yehud (IL); Ran Bar Zik, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 242 days.

(21) Appl. No.: 15/311,265

(22) PCT Filed: Aug. 28, 2014

(86) PCT No.: PCT/US2014/053106
§ 371 (c)(1),
(2) Date: Nov. 15, 2016

(87) PCT Pub. No.: WO2016/032480
PCT Pub. Date: Mar. 3, 2016

(65) Prior Publication Data
US 2017/0099360 A1    Apr. 6, 2017

(51) Int. Cl.
*G06F 15/16* (2006.01)
*H04L 29/08* (2006.01)
(Continued)

(52) U.S. Cl.
CPC ............ *H04L 67/22* (2013.01); *G06F 16/955* (2019.01); *G06F 16/957* (2019.01)

(58) Field of Classification Search
CPC ......... G06F 17/30861; G06F 17/30876; G06F 17/30899; H04L 63/105; H04L 63/20; H04L 63/10; H04L 67/22
(Continued)

(56) References Cited

U.S. PATENT DOCUMENTS 7,302,402 B2    11/2007  Callaghan et al.
8,140,643 B2     3/2012  Chen et al.
(Continued)

FOREIGN PATENT DOCUMENTS

WO    WO-2014101617 A1    7/2014

OTHER PUBLICATIONS

Amazon, "Enabling Cross-Origin Resource Sharing—Amazon Simple Storage Service", Jul. 24, 2014, docs.aws.amazon.com, web.archive. org/web/20140724151458/https://docs.aws.amazon.com/AmazonS3/latest/dev/cors.html (Year: 2014).*
(Continued)

*Primary Examiner* — Ruolei Zong (57) ABSTRACT

Examples relate to managing cross-domain information. The examples disclosed herein relate to generating a cross-domain sharing specification that comprises an identifier of a first domain and at least one type of user interaction information that a first user enables for cross-domain sharing. The at least one type of user interaction information may be selected from a plurality of types of user interaction information related to the first domain. The examples relate to obtaining, from the first domain, user interaction information corresponding to the at least one type of user interaction information and storing the user interaction information in the cross-domain sharing specification.

18 Claims, 6 Drawing Sheets

(51) Int. Cl.
*G06F 16/955* (2019.01)
*G06F 16/957* (2019.01)

(58) Field of Classification Search
USPC ............................................................ 709/217
See application file for complete search history.

(56) References Cited

U.S. PATENT DOCUMENTS

| | | |
|---|---|---|
| 2003/0037131 A1 | 2/2003 | Verma |
| 2006/0190619 A1 | 8/2006 | Tenembaum et al. |
| 2009/0327397 A1 | 12/2009 | Chen et al. |
| 2011/0040875 A1 | 2/2011 | Scholz et al. |
| 2011/0191676 A1 | 8/2011 | Guttman et al. |
| 2012/0011262 A1 | 1/2012 | Cheng et al. |
| 2012/0131104 A1 | 9/2012 | Beaven et al. |
| 2013/0318627 A1* | 11/2013 | Lundkvist ............. G06F 21/445 726/27 |
| 2014/0075513 A1* | 3/2014 | Trammel ............... H04L 9/3213 726/4 |
| 2014/0157369 A1* | 6/2014 | Mischook ............... H04L 63/10 726/4 |
| 2015/0350106 A1* | 12/2015 | Whalley ............... H04L 47/803 709/225 |

OTHER PUBLICATIONS

W3C, "Cross-Origin Resource Sharing—W3C Recommendation Jan. 16, 2014", Jul. 28, 2014, w3.org, web.archive.org/web/20140727064851/http://www.w3.org/TR/2014/REC-cors-20140116/ (Year: 2014).*
"Tracking Multiple Domains—Web Tracking (ga.js)," Google Developers, Products, Google Analytics, 2014, 9 pages.
International Search Report & Written Opinion received in PCT Application No. PCT/US2014/053106, dated May 15, 2015, 13 pages.
Laura Lorenzetti, "Facebook is Now, Officially, Following You Around the Internet," Time, Inc., Jun. 12, 2014, 3 pages.

* cited by examiner

| User Identifier | Domain Identifier | Timestamp | Sharing Time Constraint | Type of User Interaction Information | User Interaction Information |
|---|---|---|---|---|---|
| USER A | DOMAIN 1 | TIMESTAMP 1 | CONSTRAINT 1 | TYPE 1 | INFO 1 |
| | | | | TYPE 2 | INFO 2 |
| | | | | TYPE 3 | INFO 3 |
| USER A | DOMAIN 1 | TIMESTAMP 2 | CONSTRAINT 1 | TYPE 1 | INFO 4 |
| | | | | TYPE 4 | INFO 5 |
| USER B | DOMAIN 3 | TIMESTAMP 3 | CONSTRAINT 2 | TYPE 4 | INFO 6 |
| USER B | DOMAIN 1 | TIMESTAMP 4 | CONSTRAINT 1 | TYPE 2 | INFO 7 |
| | | | | TYPE 5 | INFO 8 |
| USER C | DOMAIN 4 | TIMESTAMP 5 | CONSTRAINT 3 | TYPE 6 | INFO 9 |

CROSS-DOMAIN INFORMATION MANAGEMENT

BACKGROUND

When users visit a website, the site stores and maintains certain user information for facilitating the user's interaction with the site. To preserve privacy, however, the user information with a prior site may not be transferred to new websites that the user browses.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

When users visit a website, the site stores and maintains certain user information for facilitating the user's interaction with the site. This information can be stored in cookies, term/value pairs, and URLs saved on the user's computer, or perhaps on the web site's server, if a user has an account with the site. To preserve privacy, however, the user information with a prior site may not be transferred to new websites that the user browses. Because of this, some valuable user information that can be used by other websites to enhance the user's browsing experience may be lost. To balance between the privacy and security concerns and the desire to deliver an improved browsing experience, a user-defined and user-controlled sharing of user information may be needed, allowing the user to maintain some control over which information is shared between sites.

Examples disclosed herein address these issues by generating, updating, and/or managing a cross-domain sharing specification. A user may enable a particular type of user interaction information for cross-domain sharing by selecting the particular type from a plurality of types of user interaction information related to a particular domain. In some implementation, this selection may be made via a user interface of the user's computing device. The user interaction information corresponding to the selected type may be obtained from the domain and/or stored in the cross-domain sharing specification. The user interaction information stored in the cross-domain sharing specification may be used to update content from a domain that is different from the domain from which the user interaction information has been obtained.

In some implementations, the cross-domain sharing specification may comprise a data model that organizes and/or stores a user identifier, a domain identifier, a timestamp, the type of user interaction information that the user enable for cross-domain sharing, user interaction information corresponding to the type, a sharing time constraint, and/or other information.

Figure 1:
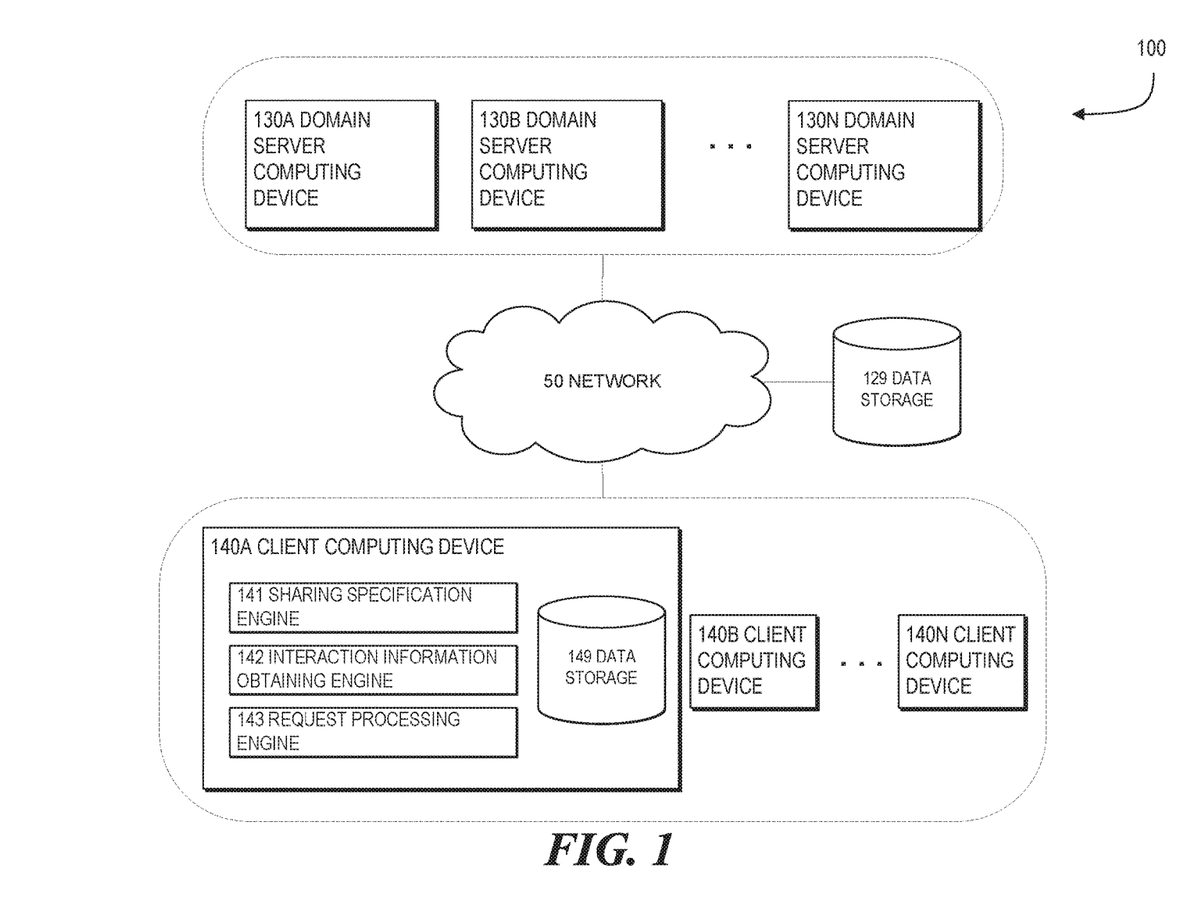
FIG. 1 is a block diagram depicting an example system comprising various components including a client computing device in communication with a domain server computing device for managing cross-domain information.

FIG. 1 is a block diagram depicting an example system 100 comprising various components including a client computing device in communication with a domain server computing device for managing cross-domain information.

The various components may include client computing devices 140 (illustrated as 140A, 140B, 140N) and domain server computing devices 130 (illustrated as domain server computing device 130A, 130B, . . . , 130N). Each client computing device 140A, 140B, . . . , 140N may communicate requests to and/or receive responses from domain server computing device 130. Domain server computing device 130 may receive and/or respond to requests from client computing devices 140. Client computing devices 140 may include any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While domain server computing device 130 is depicted as a single computing device, domain server computing device 130 may include any number of integrated or distributed computing devices serving at least one software application for consumption by client computing devices 140.

The various components (e.g., components 129, 130, and 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

According to various implementations, system 100 and the various components described herein may be implemented in hardware and/or programming that configures hardware. Furthermore, in FIG. 1 and other Figures described herein, different numbers of components or entities than depicted may be used.

As detailed below, client computing device 140 may comprise a sharing specification engine 141, an interaction information obtaining engine 142, a request processing engine 143, and/or other engines. The term "engine", as used herein, refers to a combination of hardware and programming that performs a designated function. As is illustrated respect to FIG. 2, the hardware of each engine, for example, may include one or both of a processor and a machine-readable storage medium, while the programming is instructions or code stored on the machine-readable storage medium and executable by the processor to perform the designated function.

As used herein, the "user interaction information" may comprise transactional information (e.g., a cookie) transmitted from a domain (e.g., a website hosted by a domain server) to a client computing device. The user interaction information may be collected by a domain while a user interacts with content provided by that domain. For example, when the user, using a client computing device, enters a search query into a search bar of a particular domain, the information related to the search query may be collected by that domain and/or provided to the client computing device.

Sharing specification engine 141 may generate, update, and/or manage a cross-domain sharing specification that may specify types of user interaction information that a user enables for cross-domain sharing. "Cross-domain sharing," as used herein, may refer to sharing user interaction information with at least one domain other than the domain from which the user interaction information is collected. The user (e.g., a first user) may enable a particular type (e.g., a first type) of user interaction information for cross-domain sharing by selecting the first type from a plurality of types of user interaction information related to a particular domain (e.g., a first domain). In some implementation, this selection may be made via a user interface of the client computing device. For example, while the user browses a first website via a browser of the client computing device, the user may want to enable cross-domain sharing of search queries that the user will be entering in the search bar presented on the top of the first website. To do this, the user may right click on the search bar and click on a "Share" button to enable cross-domain sharing all of the user's search queries (and/or the results from the search queries). In another example, the user may be engaged in an online shopping activity by adding product items into an online shopping cart. The user may click on the "Share" button that may be displayed adjacent to a graphical icon that represents the shopping cart to enable cross-domain sharing of the information related to the product items in the online shopping cart.

As such, when content provided by a domain or website is rendered by the browser and presented to the user, the user may select (e.g., right-clicking and selecting a button, selecting a button that is adjacently located to, highlighting, double-clicking, etc.) a particular portion of the content (e.g., the search bar, the shopping cart, a user's profile, a multi-media player, a "Play" button for playing multimedia content, a "Like" button to show an interest, a "Favorite" button, etc.) to communicate the user's desire to enable cross-domain sharing of the type of user interaction information that corresponds to that particular portion of the content. Thus, the cross-domain sharing specification may be a user-defined and user-driven specification, giving the user more control over information sharing and allowing for the selective and controlled sharing of the user interaction information.

Figure 5:
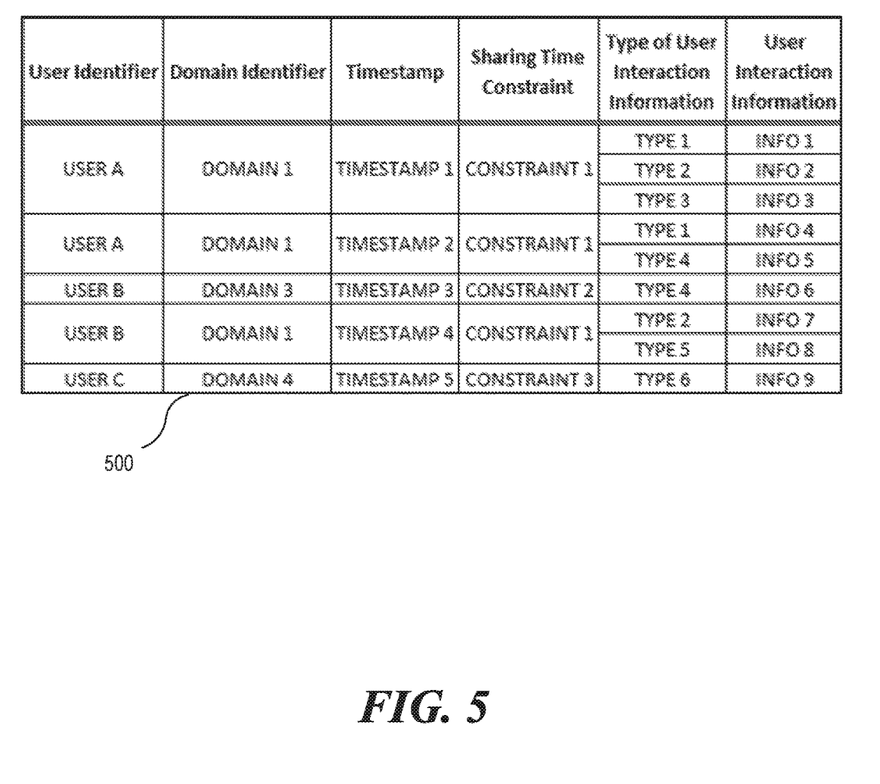
FIG. 5 is a diagram depicting an example cross-domain sharing specification for organizing and storing user interaction information for cross-domain sharing.

The cross-domain sharing specification may comprise a data model that organizes and/or stores a user identifier of the first user (e.g., an identification (ID) that uniquely identifies the first user such as the first user's digital fingerprint, a user login, an IP address, etc.), a domain identifier of the first domain (e.g., a first domain from which user interaction information is transmitted), a timestamp (e.g., a timestamp for when the first user initiates access to the first domain, a timestamp for when the first user selects the first type of user interaction information to enable cross-domain sharing of the first type of user interaction information, etc.), the first type of user interaction information that the first user enable for cross-domain sharing, first user interaction information corresponding to the first type, a sharing time constraint, and/or other information. An example cross-domain sharing specification is illustrated in FIG. 5.

Interaction information obtaining engine 142 may obtain the first user interaction information from the first domain based on the cross-domain sharing specification. In other words, interaction information obtaining engine 142 may obtain the information about user interaction of the first user with the first domain with respect to the first type of information as indicated in the cross-domain sharing specification. For example, based on the types specified in the cross-domain sharing specification, a domain may collect the user interaction information corresponding to the specified types. In this example, if the first user specifies that search queries to be entered through a particular search bar on a webpage provided by the first domain should be shared with domains other than the first domain (e.g., a second domain), the cross-domain sharing specification may store the first type of user interaction information (e.g., the search queries to be entered through the particular search bar) by associating the first type of information with the user identifier of the first user, the domain identifier of the first domain, the timestamp, the sharing time constraint, etc.

Based on the cross-domain sharing specification, the first domain may collect the first user interaction information corresponding to the first type of information and/or provide the first user interaction information to the client computing device. Interaction information obtaining engine 142 may obtain the first user interaction information and/or include (e.g., store) the first user interaction information in the cross-domain sharing specification such that the first user interaction information may be associated with the user identifier of the first user, the domain identifier of the first domain, the timestamp, the first type of information, and/or the sharing time constraint. The cross-domain sharing specification may be stored in a local data storage (e.g., a data storage 149) coupled to the client computing device or a remote data storage (e.g., a data storage 129) such as a cloud-based data storage.

In some implementations, the first user may enable cross-domain sharing of the first type of information (e.g., the search queries to be entered through the particular search bar) but not a second type of user interaction information (e.g., the first user's shopping cart on an online shopping site). The cross-domain sharing specification may therefore include a data record of the first type of information associated with the first user, the first domain, a timestamp, and/or a sharing time constraint. However, the cross-domain sharing specification may not have a data record for the second type of information. For example, while the first user interacts with the first domain (e.g., by entering a search query, adding a new item to the shopping cart, etc.), the first user interaction information (e.g., information about the search query entered) corresponding to the first type may be collected by the first domain and provided to the client computing device of the first user. On the other hand, second user interaction information (e.g., the items in the shopping cart) corresponding to the second type may not be collected by the first domain. Thus, in this example, interaction information obtaining engine 142 may obtain the first user interaction information but not the second user interaction information from the first domain.

The sharing time constraint may specify temporal boundaries for when and how long user interaction information is shared. The temporal boundaries may permit cross-domain sharing in accordance with the cross-domain sharing specification either from a present time (or the time indicated in the timestamp) to a specified time in the future or between a set of user specified dates and times. Such temporal limits may ensure that outdated user interaction information is not shared between domains. For example, the sharing time constraint may be set to allow the cross-domain sharing of the user interaction information for a predetermined time period (e.g., 20 minutes) after the time indicated in the timestamp associated with the user interaction information. Therefore, in this example, sharing specification engine 141 may determine whether to share the user interaction information based on the timestamp.

Request processing engine 143 may provide the shared user interaction information to at least one domain (e.g., a second domain) other than the domain from which the user interaction information is collected (e.g., the first domain). Request processing engine 143 may obtain, from the first user, a request for content from the second domain. Upon receiving the request, request processing engine 143 may access the cross-domain sharing specification to identify and/or determine at least a portion of the user interaction information to be provided to the second domain. In some implementations, the at least a portion of the user interaction information may include the user interaction information associated with the first user and collected from multiple domains, the user interaction information associated with the first user and collected only from the first domain, the user interaction information associated with multiple users and collected from multiple domains, the user interaction information associated with multiple users and collected only by the first domain, etc. In some implementations, the at least a portion of the user interaction information may be retrieved and/or provided to the second domain using at least one web service application programming interface (API) (e.g., browser APIs, REST APIs, etc.)

In some implementations, the at least a portion of the user interaction information may be identified and/or determined based on the request (e.g., including information about the content requested by the request). For example, when the request was made to retrieve a page from an online shopping store, request processing engine 143 may determine a portion of the user interaction information that may be related to the online shopping store, which may include, in one example, the interaction information collected from other online shopping stores.

Request processing engine 143 may provide the at least a portion of the user interaction to the second domain such that the requested content may be updated based on the at least a portion of the user interaction information. For example, after the first user made some search queries through the first domain, the first user may decide to visit the second domain to start shopping for new clothes. A list of product items that may be recommended by the second domain may be influenced by the search queries that the first user submitted through the first domain.

In performing their respective functions, engines 141-143 may access data storage 129 and/or data storage 149. Engines 141-143 may access data storage 149 locally and/or data storage 129 remotely via network 50 or other networks. Data storages 129 and 149 may represent any memory accessible to engines 141-143 that can be used to store and retrieve data. Data storages 129 and 149 may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data.

Data storages 129 and 149 may include a database to organize and store data. Database may be, include, or interface to, for example, an Oracle™ relational database sold commercially by Oracle Corporation. Other databases, such as Informix™ DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
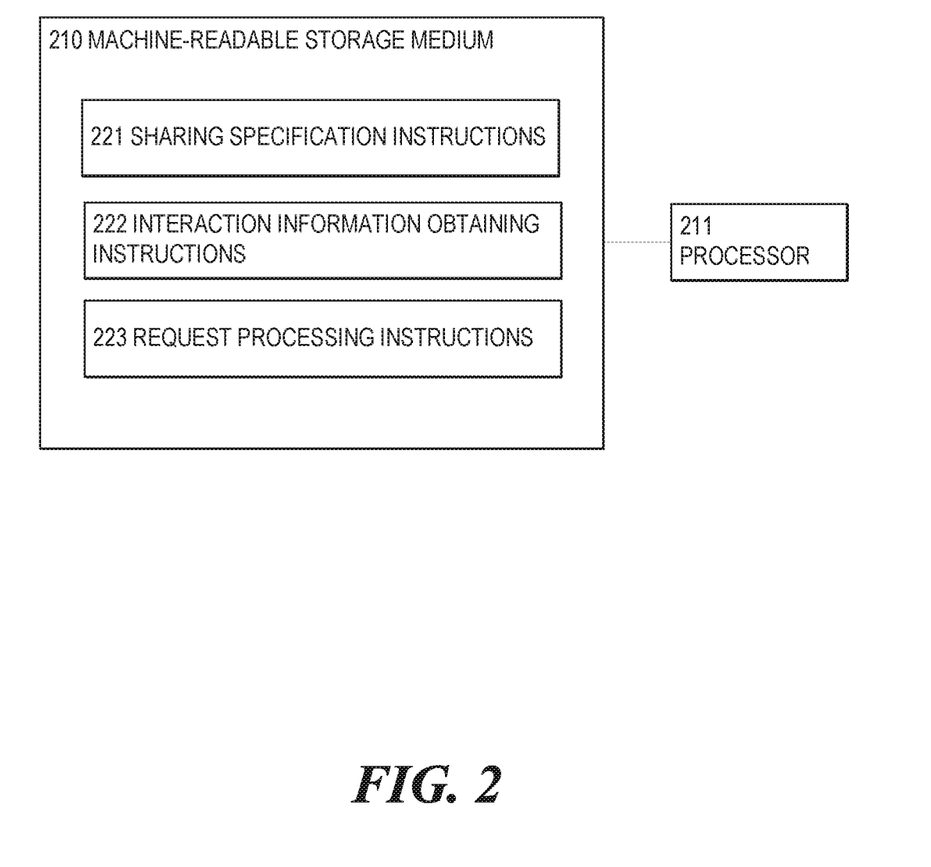
FIG. 2 is a block diagram depicting an example machine-readable storage medium comprising instructions executable by a processor for managing cross-domain information.

FIG. 2 is a block diagram depicting an example machine-readable storage medium 210 comprising instructions executable by a processor for managing cross-domain information.

In the foregoing discussion, engines 141-143 were described as combinations of hardware and programming. Engines 141-143 may be implemented in a number of fashions. Referring to FIG. 2, the programming may be processor executable instructions 221-223 stored on a machine-readable storage medium 210 and the hardware may include a processor 211 for executing those instructions. Thus, machine-readable storage medium 210 can be said to store program instructions or code that when executed by processor 211 implements engines 141-143 of FIG. 1.

Machine-readable storage medium 210 may be any electronic, magnetic, optical, or other physical storage device that contains or stores executable instructions. In some implementations, machine-readable storage medium 210 may be a non-transitory storage medium, where the term "non-transitory" does not encompass transitory propagating signals. Machine-readable storage medium 210 may be implemented in a single device or distributed across devices. Likewise, processor 211 may represent any number of processors capable of executing instructions stored by machine-readable storage medium 210. Processor 211 may be integrated in a single device or distributed across devices. Further, machine-readable storage medium 210 may be fully or partially integrated in the same device as processor 211, or it may be separate but accessible to that device and processor 211.

In one example, the program instructions may be part of an installation package that when installed can be executed by processor 211 to implement engines 141-143. In this case, machine-readable storage medium 210 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 210 may include a hard disk, optical disk, tapes, solid state drives, RAM, ROM, EEPROM, or the like.

Processor 211 may be at least one central processing unit (CPU), microprocessor, and/or other hardware device suitable for retrieval and execution of instructions stored in machine-readable storage medium 210. Processor 211 may fetch, decode, and execute program instructions 221-223, and/or other instructions. As an alternative or in addition to retrieving and executing instructions, processor 211 may include at least one electronic circuit comprising a number of electronic components for performing the functionality of at least one of instructions 221-223, and/or other instructions.

In FIG. 2, the executable program instructions in machine-readable storage medium 210 are depicted as sharing specification instructions 221, interaction information obtaining instructions 222, and request processing instructions 223. Instructions 221-223 represent program instructions that, when executed, cause processor 211 to implement engines 141-143, respectively. In some implementations, machine-readable storage medium 210 may comprise a browser plug-in that may include instructions 221-223.

Figure 3:
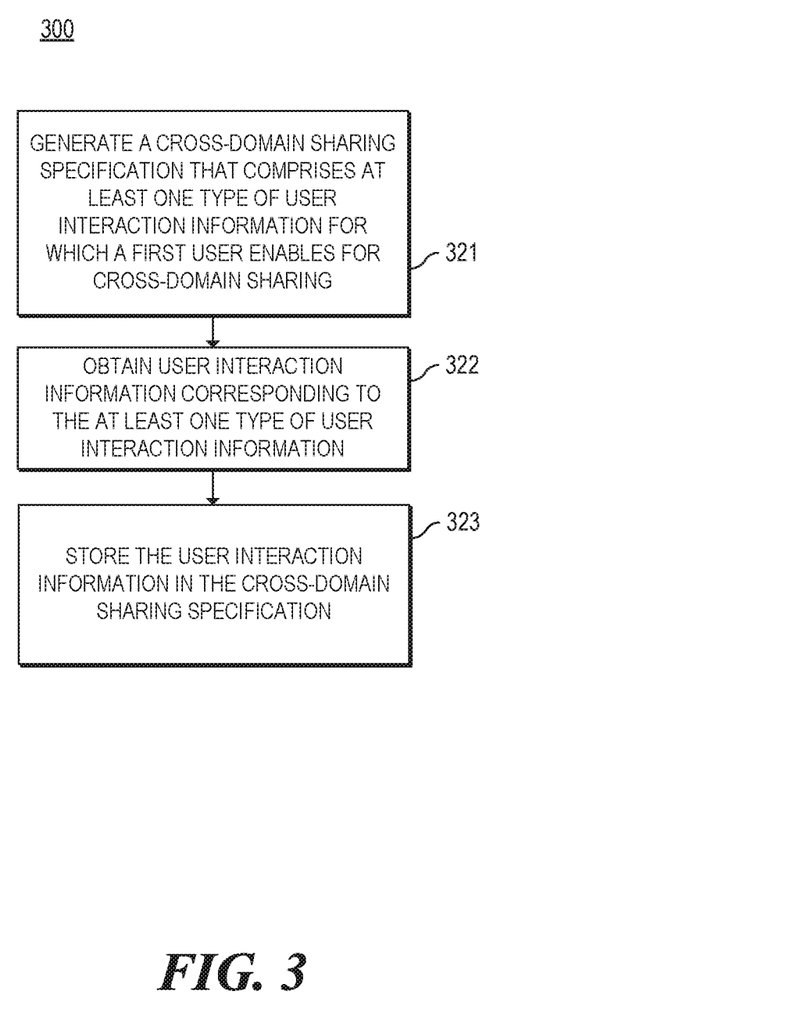
FIG. 3 is a flow diagram depicting an example method for managing cross-domain information.

FIG. 3 is a flow diagram depicting an example method 300 for managing cross-domain information. The various processing blocks and/or data flows depicted in FIG. 3 (and in the other drawing figures such as FIG. 4) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 300 as illustrated (and described in greater detail below) is meant be an example and, as such, should not be viewed as limiting. Method 300 may be implemented in the form of executable instructions stored on a machine-readable storage medium, such as storage medium 210, and/or in the form of electronic circuitry.

Method 300 may start in block 321 where a cross-domain sharing specification may be generated. The cross-domain sharing specification may comprise an identifier of a first domain and at least one type of user interaction information that a first user enables for cross-domain sharing. For example, the first user may enable a particular type of user interaction information for cross-domain sharing by selecting that type from a plurality of types of user interaction information related to the first domain. In some implementation, this selection may be made via a user interface of the client computing device. For example, while the first user browses a first website via a browser of the client computing device, the user may want to enable cross-domain sharing of search queries that the user will be entering in the search bar presented on the top of the first website. To do this, the user may right click on the search bar and click on a "Share" button to enable cross-domain sharing all of the user's search queries (and/or the results from the search queries).

In block 322, method 300 may obtain, from the first domain, user interaction information corresponding to the at least one type of user interaction information that the first user enabled for cross-domain sharing. For example, based on the at least one type specified in the cross-domain sharing specification, the first domain may collect user interaction information corresponding to the specified type. In this example, if the first user specifies that search queries to be entered through a particular search bar on a webpage provided by the first domain should be shared with domains other than the first domain (e.g., a second domain), the first domain may collect the user interaction information corresponding to the search queries and/or provide the user interaction information to the client computing device.

In block 323, method 300 may store the user interaction information obtained from the first domain in the cross-domain sharing specification. In some implementations, the user interaction information may be associated with the user identifier of the first user, the domain identifier of the first domain, a timestamp, the at least one type of information, a sharing time constraint, etc. The cross-domain sharing specification may be stored in a local data storage (e.g., data storage 149) coupled to the client computing device or a remote data storage (e.g., data storage 129) such as a cloud-based data storage.

Referring back to FIG. 1, sharing specification engine 121 may be responsible for implementing block 321. Interaction information obtaining engine 122 may be responsible for implementing block 322 and 323.

Figure 4:
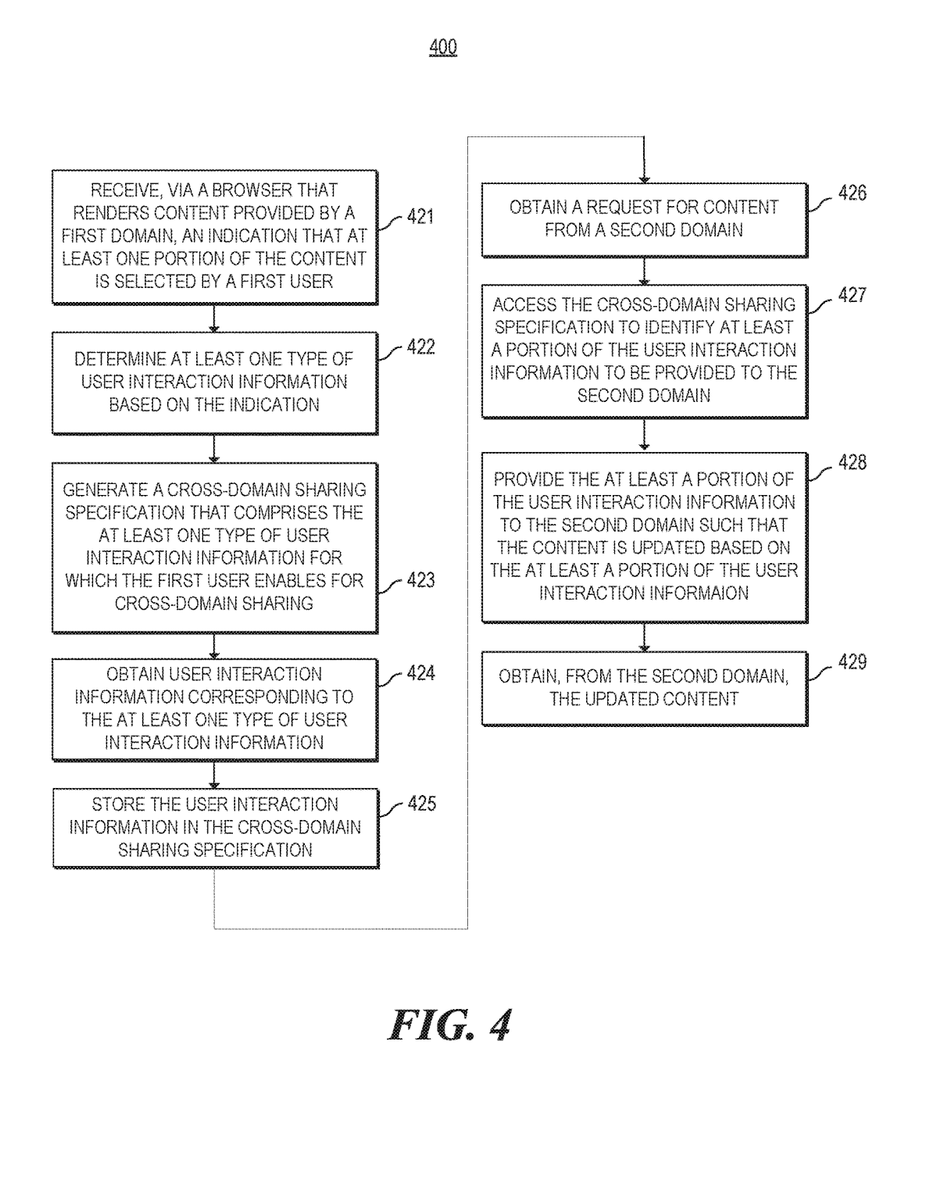
FIG. 4 is a flow diagram depicting an example method for managing cross-domain information.

FIG. 4 is a flow diagram depicting an example method 400 for managing cross-domain information. Method 400 as illustrated (and described in greater detail below) is meant be an example and, as such, should not be viewed as limiting. Method 400 may be implemented in the form of executable instructions stored on a machine-readable storage medium, such as storage medium 210, and/or in the form of electronic circuitry.

Method 400 may start in block 421 where method 400 may receive, via a browser that renders content provided by a first domain, an indication that at least one portion of the content is selected by a first user. In block 422, method 400 may determine at least one type of user interaction information based on the indication. For example, while a user browses a first website via a browser of the client computing device, the user may want to enable cross-domain sharing of search queries that the user will be entering in the search bar presented on the top of the first website. To do this, the user may right click on the search bar and click on a "Share" button to enable cross-domain sharing all of the user's search queries (and/or the results from the search queries), In another example, the user may be engaged in an online shopping activity by adding product items into an online shopping cart. The user may click on the "Share" button that may be displayed adjacent to a graphical icon that represents the shopping cart to enable cross-domain sharing of the information related to the product items in the online shopping cart. As such, when content provided by a domain or website is rendered by the browser and presented to the user, the user may select (e.g., right-clicking and selecting a button, selecting a button that is adjacently located to, highlighting, double-clicking, etc.) a particular portion of the content (e.g., the search bar, the shopping cart, a user's profile, a multi-media player, a "Play" button for playing multimedia content, a "Like" button to show an interest, a "Favorite" button, etc.) to communicate the user's desire to enable cross-domain sharing of the type of user interaction information that corresponds to that particular portion of the content.

In block 423, a cross-domain sharing specification may be generated. The cross-domain sharing specification may comprise an identifier of the first domain and the at least one type of user interaction information that the first user enables for cross-domain sharing in blocks 421 and 422.

In block 424, method 400 may obtain, from the first domain, user interaction information corresponding to the at least one type of user interaction information that the first user enabled for cross-domain sharing. For example, based on the at least one type specified in the cross-domain sharing specification, the first domain may collect user interaction information corresponding to the specified type. In this example, if the first user specifies that search queries to be entered through a particular search bar on a webpage provided by the first domain should be shared with domains other than the first domain (e.g., a second domain), the first domain may collect the user interaction information corresponding to the search queries and/or provide the user interaction information to the client computing device.

In block 425, method 400 may store the user interaction information obtained from the first domain in the cross-domain sharing specification. In some implementations, the user interaction information may be associated with the user identifier of the first user, the domain identifier of the first domain, a timestamp, the at least one type of information, a sharing time constraint, etc. The cross-domain sharing specification may be stored in a local data storage (e.g., data storage 149) coupled to the client computing device or a remote data storage (e.g., data storage 129) such as a cloud-based data storage.

In block 426, method 400 may obtain a request for content from a second domain. Upon receiving the request, method 400 may access the cross-domain sharing specification to identify and/or determine at least a portion of the user interaction information to be provided to the second domain (block 427). In some implementations, the at least a portion of the user interaction information may include the user interaction information associated with the first user and collected from multiple domains, the user interaction information associated with the first user and collected only from the first domain, the user interaction information associated with multiple users and collected from multiple domains, the user interaction information associated with multiple users and collected only by the first domain, etc.

In block 428, method 400 may provide the at least a portion of the user interaction to the second domain such that the requested content may be updated based on the at least a portion of the user interaction information. In block 429, method 400 may obtain, from the second domain, the updated content. The updated content may be communicated to the first user via a display coupled to the client computing device. For example, after the first user made some search queries through the first domain, the first user may decide to visit the second domain to start shopping for new clothes. A list of product items that may be recommended by the second domain may be influenced by the search queries that the first user submitted through the first domain.

Referring back to FIG. 1, sharing specification engine 121 may be responsible for implementing blocks 421-423. Interaction information obtaining engine 122 may be responsible for implementing blocks 424 and 425. Request processing engine 123 may be responsible for implementing blocks 426-429.

FIG. 5 is a diagram depicting an example cross-domain sharing specification 500 for organizing and storing user interaction information for cross-domain sharing.

The cross-domain sharing specification 500 may comprise a data model that organizes and/or stores a user identifier (e.g., an identification (ID) that uniquely identifies a user such as the user's digital fingerprint, a user login, an IP address, etc.), a domain identifier (e.g., a domain from which user interaction information is transmitted), a timestamp (e.g., a timestamp for when the user initiates access to the domain, a timestamp for when the user selects a particular type of user interaction information to enable cross-domain sharing of the particular type of user interaction information, etc.), a sharing time constraint, a type of user interaction information (e.g., that the user enable for cross-domain sharing), user interaction information corresponding to the type, and/or other information.

In the example depicted in FIG. 5, User A may visit Domain 1 at a time indicated by Timestamp 1. User A may identify and/or select Types 1, 2, and 3 of user interaction information for cross-domain sharing. Domain 1 may collect user interaction information (e.g., Info 1, 2, and 3) corresponding to each type selected by User A and provide to the client computing device of User A. The user interaction information obtained from Domain 1 may be stored in the cross-domain sharing specification 500.

User A may later visit Domain 1 again at a different time indicated by Timestamp 2 and select a different set of user interaction data types (indicated by Types 1 and 4). Similarly, User B may visit Domain 3 at a time indicated by Timestamp 3 and indicate that Type 4 of user interaction information should be enabled for cross-domain sharing. The user interaction information (e.g., Info 6) corresponding to Type 4 may be collected by Domain 3 and provided to the client computing device of User B. User B may also visit Domain 1 at a time indicated by Timestamp 4 and select two types of user interaction information (e.g., Types 2 and 5) for which user interaction information (e.g., Info 7 and 8) may be collected and stored in the cross-sharing specification 500. Likewise, User C may visit Domain 4 at a time indicated by Timestamp 5 and select Type 6 of user interaction information for cross-domain sharing. The user interaction information (e.g., Info 9) corresponding to Type 6 may be collected by Domain 4, provided to the client computing device of User C, and/or stored in the cross-domain sharing specification 500.

The sharing time constraint (e.g., constraints 1, 2, and 3) may specify temporal boundaries for when and how long user interaction information is shared. The temporal boundaries may permit cross-domain sharing in accordance with the cross-domain sharing specification 500 either from a present time (or the time indicated in the timestamp) to a specified time in the future or between a set of user specified dates and times. Such temporal limits may ensure that outdated user interaction information is not shared between domains.

Although the cross-domain sharing specification 500 as depicted in FIG. 5 includes user interaction information associated with multiple users and multiple domains, it may be divided into multiple specifications based on the user identifier, the domain identifier, or various other ways. The cross-domain sharing specification 500 may be stored in a local data storage (e.g., data storage 149) coupled to the client computing device or a remote data storage (e.g., data storage 129) such as a cloud-based data storage.

Figure 6:
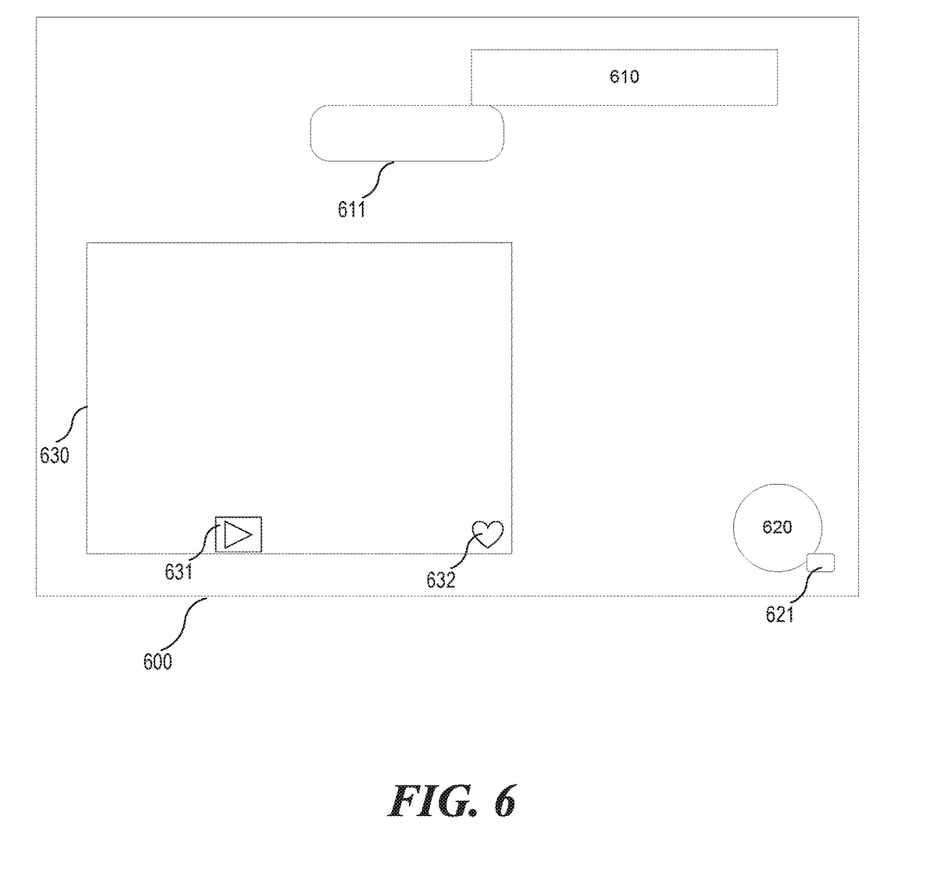
FIG. 6 is a diagram depicting an example user interface for selecting a type of user interaction information for which cross-domain sharing is enabled.

FIG. 6 is a diagram depicting an example user interface 600 for selecting a type of user interaction information for which cross-domain sharing is enabled.

User interface 600 may display content provided by a first domain. For example, a user may view a website (e.g., the first domain) via a browser that renders the content of the website. Via user interface 600, the user may select (e.g., right-clicking and selecting a button, selecting a button that is adjacently located to, highlighting, double-clicking, etc.) a particular portion of the content (e.g., the search bar, the shopping cart, a user's profile, a multi-media player, a "Play" button for playing multimedia content, a "Like" button to show an interest, a "Favorite" button, etc.) to communicate the user's desire to enable cross-domain sharing of the type of user interaction information that corresponds to that particular portion of the content. Thus, the cross-domain sharing specification may be a user-defined and user-driven specification, giving the user more control over information sharing and allowing for the selective and controlled sharing of the user interaction information.

In one example, the user may select a search bar 610 (e.g., right-clicking and selecting a "Share" button 611) to enable cross-domain sharing all of the user's search queries (and/or the results from the search queries). In another example, the user may be engaged in an online shopping activity by adding product items into an online shopping cart. The user may select (e.g., clicking on a "Share" button 621 that may be displayed adjacent to a graphical icon 620 that represents the shopping cart) the shopping cart to enable cross-domain sharing of the information related to the product items in the online shopping cart. In yet another example, user interface 600 may include a multimedia player 630 that may play text, image, video, audio, and/or other multimedia content. The user may select a "Play" button 631 to enable cross-domain sharing of the information related to the multimedia content that the user plays via the multimedia player 630. In yet another example, the user may select a "Favorite" button 632 to enable cross-domain sharing of the information related to what multimedia content the user is interested in and likes.

The foregoing disclosure describes a number of example implementations for cross-domain information management. The disclosed examples may include systems, devices, computer-readable storage media, and methods for cross-domain information management. For purposes of explanation, certain examples are described with reference to the components illustrated in FIGS. 1 and 2. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3 and 4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method performed by a computing device, comprising:
   accessing, in response to a first query from a user, content of a first domain;
   receiving, in association with rendering the content of the first domain responsive to the first query, a user selection relating to a first type of user interaction information for cross-domain sharing;
   generating a cross-domain sharing specification that comprises an identifier of the first domain and the first type of user interaction information that the user has selected for the cross-domain sharing, wherein the first type of user interaction information is selected from a plurality of types of user interaction information related to the first domain;
   obtaining, from the first domain, user interaction information corresponding to the first type of user interaction information;
   storing the obtained user interaction information in the cross-domain sharing specification;
   in response to a second query from the user for content of a second domain different from the first domain, accessing the cross-domain sharing specification to identify a respective user interaction information to send to the second domain;
   sending, to the second domain, the respective user interaction information, to cause the second domain to produce a search result for the second query based on the respective user interaction information; and
   receiving, from the second domain, the search result based on the respective user interaction information.

2. The method of claim 1, wherein the obtained user interaction information comprises information about user interaction of the user with the first domain with respect to the first type of user interaction information.

3. The method of claim 1, wherein the cross-domain sharing specification is stored in a local data storage coupled to the computing device or a cloud-based data storage.

4. The method of claim 1, further comprising:
   receiving, via a browser that renders the content provided by the first domain in response to the first query, the user selection; and
   determining the first type of user interaction information based on the user selection.

5. The method of claim 1, wherein the first type of user interaction information includes a user query or a result of a user query.

6. The method of claim 1, wherein the first type of user interaction information is based on user selection of a portion of content rendered by the computing device in response to the content received from the domain responsive to the first query.

7. The method of claim 1, wherein the cross-domain sharing specification includes a time constraint for the first type of user interaction information, the time constraint specifying a temporal boundary beyond which the first type of user interaction information is not shared with another domain different from the first domain.

8. A non-transitory machine-readable storage medium comprising instructions that upon execution cause a computing device to:
   receive, via a browser that renders first content provided by a first domain in response to a first query from a user, a user selection of a first type of information that the user selected for sharing with a second domain;
   include a user identifier of the user, a domain identifier of the first domain, and the first type of information in a cross-domain sharing specification;
   in response to a second query from the user for content of the second domain, access the cross-domain sharing specification to identify a respective user interaction information to send to the second domain;
   send, to the second domain, the respective user interaction information, to cause the second domain to produce a search result for the second query based on the respective user interaction information; and
   receive, from the second domain, the search result based on the respective user interaction information.

9. The non-transitory machine-readable storage medium of claim 8, wherein the instructions upon execution cause the computing device to further:
  receive, from the browser that renders the first content provided by the first domain, a user selection of a second type of information that the user selected for sharing with the second domain;
  include the user identifier of the user, the domain identifier of the first domain, and the second type of information in the cross-domain sharing specification.

10. The non-transitory machine-readable storage medium of claim 8, wherein the cross-domain sharing specification is stored in a local data storage coupled to the computing device or a cloud-based data storage.

11. The non-transitory machine-readable storage medium of claim 8, wherein the cross-domain sharing specification includes user interaction information obtained from a plurality of different domains.

12. The non-transitory machine-readable storage medium of claim 8, wherein the user selection comprises a selection of a portion of the first content rendered by the browser in response to the first query.

13. The non-transitory machine-readable storage medium of claim 8, wherein the cross-domain sharing specification includes a time constraint for the first type of information, the time constraint specifying a temporal boundary beyond which the first type of information is not shared with the second domain.

14. The non-transitory machine-readable storage medium of claim 8, wherein the cross-domain sharing specification includes user interaction information obtained from a plurality of different domains.

15. A system comprising:
  a processor; and
  a non-transitory storage medium storing instruction executable on the processor to:
    render, via a browser of a client computing device, first content provided by a first domain in response to a first query from a user;
    receive, via the browser, a user selection that a first portion of the first content is selected by the user to enable cross-domain sharing of a first type of information, wherein the first type of information corresponds to the first portion of the first content;
    store, in a cross-domain sharing specification, the first type of information by associating the first type of information with a user identifier of the user and a domain identifier of the first domain;
    obtain first information about user interaction of the user with the first domain relating to the first type of information;
    include the first information in the cross-domain sharing specification, wherein the first information is associated with the user identifier of the user, the domain identifier of the first domain, and the first type of information;
    in response to a second query from the user for content of a second domain different from the first domain, access the cross-domain sharing specification to identify a respective user interaction information to send to the second domain;
    send, to the second domain, the respective user interaction information, to cause the second domain to produce a search result for the second query based on the respective user interaction information; and
    receive, from the second domain, the search result based on the respective user interaction information.

16. The system of claim 15, wherein the cross-domain sharing specification does not include second information about user interaction of the user with the first domain relating to a second type of information when the user has not enabled cross-domain sharing of the second type of information.

17. The system of claim 15, wherein the instructions are executable on the processor to:
  determine a timestamp for when the user selection is received; and
  store, in the cross-domain sharing specification, the timestamp by associating the timestamp with the user identifier of the user, the domain identifier of the first domain, and the first type of information.

18. The system of claim 17, wherein the instructions are executable on the processor to:
  determine whether to share the respective user interaction information with the second domain based on the timestamp.

* * * * *